United States Patent [19]

Haven et al.

[11] 4,004,271
[45] Jan. 18, 1977

[54] LOW TIRE PRESSURE WARNING SYSTEM

[75] Inventors: Harold A. Haven, Hale; John A. Stewart, Flint, both of Mich.

[73] Assignee: General Motors Corporation, Detroit, Mich.

[22] Filed: Aug. 1, 1975

[21] Appl. No.: 601,319

Related U.S. Application Data

[63] Continuation of Ser. No. 532,404, Dec. 13, 1974.

[52] U.S. Cl. .............................. 340/58; 200/61.25; 200/82 R; 335/205
[51] Int. Cl.² ........................................ B60C 23/02
[58] Field of Search ....... 340/58; 200/61.22, 61.25, 200/82 R, 83 L; 335/205

[56] References Cited

UNITED STATES PATENTS 3,873,787    3/1975    Nozi .............................. 340/58 X Primary Examiner—Alvin H. Waring
Attorney, Agent, or Firm—Warren D. Hill

[57] ABSTRACT

A vehicle pneumatic tire low pressure warning system including a low pressure air switch carried on the vehicle rotating wheel assembly which compares a reference pressure and the tire pressure and couples the tire air to an actuator on the rotating wheel assembly when the difference exceeds a specified amount. The tire air operates the actuator to position a magnet to actuate a reed switch sensor on a stationary member of the vehicle. A signal is provided in response to the reed switch actuation to warn the vehicle operator of the low tire pressure.

4 Claims, 7 Drawing Figures

LOW TIRE PRESSURE WARNING SYSTEM

This is a continuation of application Ser. No. 532,404, filed Dec. 13, 1974.

This invention relates to a vehicle low tire pressure warning system for providing an indication to the vehicle operator when the pressure within one of the vehicle tires has decreased below a reference pressure.

Numerous low tire pressure warning systems have been proposed for providing an indication when the pressure within a vehicle tire decreases below some reference level. These known tire pressure warning systems include systems wherein the air within the tire is coupled to and operates an actuator when the tire pressure had decreased to a specified level. Operation of the actuator is sensed to provide an indication of the decreased tire pressure. It is to this form of tire pressure sensor to which this invention is directed.

It is the general object of this invention to provide for an improved low tire pressure warning system.

It is another object of this invention to provide for a tire pressure warning system wherein a charged bellows establishes a reference pressure and functions to operate a valve unit to couple tire air to an actuator when the tire pressure decreases to a specified level below the charged bellows reference.

It is another object of this invention to provide for an improved low tire pressure warning system employing a temperature compensated low pressure air switch.

It is another object of this invention to provide for an improved low tire pressure warning system including a low pressure air switch employing a charged bellows establishing a reference pressure wherein the bellows is charged to the desired reference tire pressure by exposing tire pressure to each side thereof.

It is another object of this invention to provide for a low tire pressure warning system having an improved actuator for providing a magnetic field which is sensed to provide an indication of low tire pressure.

It is another object of this invention to provide for a low tire pressure warning system having an improved actuator with a magnetic latch to prevent erroneous tire pressure indication resulting from vehicle movement.

These and other objects of this invention may be best understood by reference to the following description of a preferred embodiment and the drawings in which.

Figure 1:
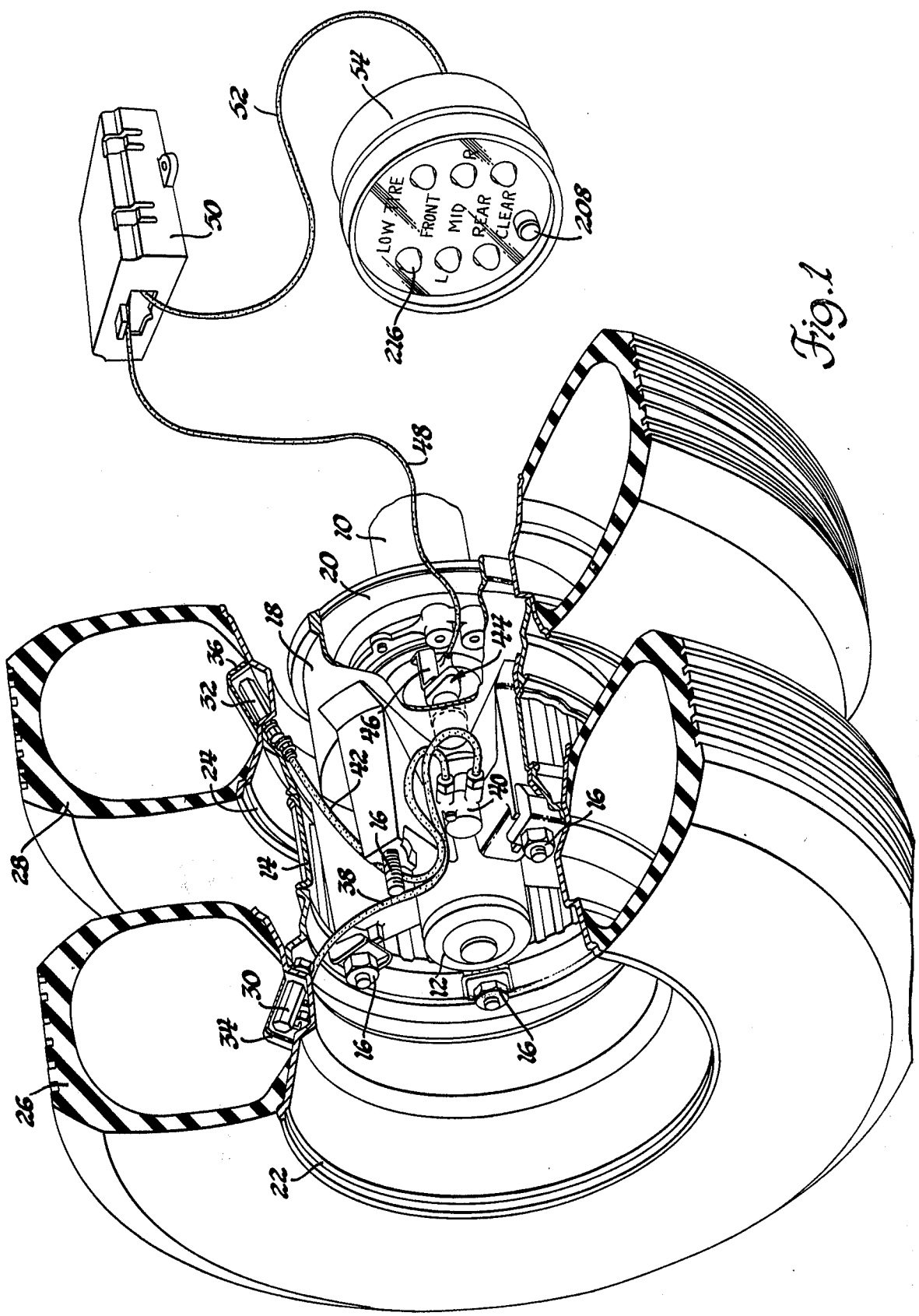
FIG. 1 is a perspective view of a dual wheel and tire assembly illustrating the low tire pressure warning system of this invention.

Referring to FIG. 1, there is illustrated a dual wheel assembly of conventional construction which may be used, for example, on a truck or bus. The invention is described with respect to such a dual wheel system for illustration purposes only, it being apparent that the tire pressure warning system of this invention may be readily adapted for use with single or multiple tired wheels.

An axle housing 10 is connected to the vehicle chassis for supporting the vehicle wheel assembly. A rotatable hub 12 is mounted on the axle housing 10 by means of suitable bearings and is driven by a rotatable axle (not shown) extending through the axle housing 10. A wheel 14 is connected to the hub 12 by bolt assemblies 16 which also secure a brake drum 18 to the hub 12. A plate member 20 is mounted on the axle housing 10 within the rim of the brake drum 18 and may support the brake shoes which cooperate with the brake drum 18 in the conventional manner. A rim 22 and a rim 24 are each mounted on the wheel 14 and inflatable pneumatic tires 26 and 28 are mounted on the rims 22 and 24, respectively. The tires 26 and 28 are inflated in the usual manner through a valve stem (not shown) to a desired pressure.

A low pressure air switch assembly 30 is mounted on the rim 22 extending into the tire 26 to monitor the air pressure therein. A low pressure air switch assembly 32 is mounted on the rim 24 extending into the tire 28 to monitor the tire pressure therein. Shields 34 and 36 are provided for protecting the air switch assemblies 30 and 32, respectively, during assembly of the tires 26 and 28 on the rims 22 and 24.

An air hose 38 couples the output of the low pressure air switch assembly 30 to one air inlet of an actuator 40 and an air hose 42 couples the output of the low pressure air switch assembly 32 to a second air inlet of the actuator 40. The actuator 40 is mounted on the face of the brake drum 18 so as to extend laterally therethrough.

A sensor 44 is mounted to the plate member 20 by means of a bracket assembly 46 such that the sensor 44 is positioned adjacent a path traced by the end of the actuator 40. An electric cable 48 couples the sensor 44 to a signal processor 50 whose output is coupled by a cable 52 to an instrument panel display 54.

Each of the low pressure air switches 30 and 32 are responsive to the air pressures within the respective tires 26 and 28 and function to couple the air within those tires to the actuator 40 via the respective air hoses 38 and 42 when the pressure sensed thereby decreases to a specified level below a reference pressure. The air under pressure from the respective tire 26 or 28 operates the actuator 40 which generates an external magnetic field. The sensor 44 is responsive to the magnetic field produced by the actuator 40 to generate an electric signal which is coupled to the signal processor 50 through the cable 48. The signal processor 50 supplies a signal via the cable 52 to energize an appropriate indicator in the instrument panel display 54 to provide an indication of the decreased tire pressure.

Figure 2:
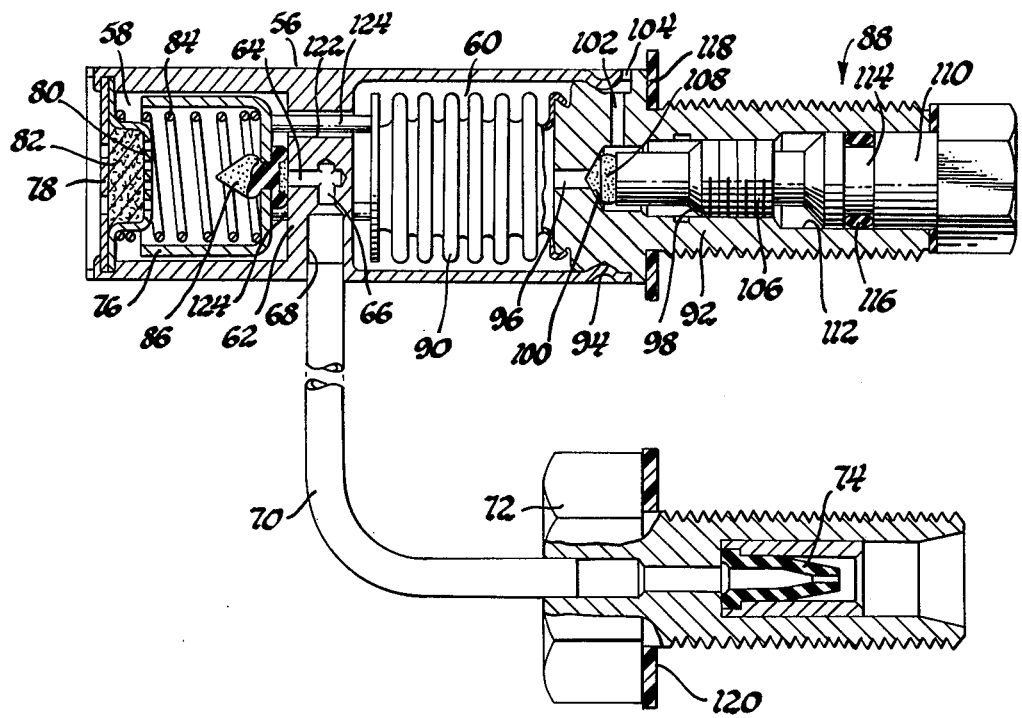
FIG. 2 is a longitudinal sectional view of one of the low pressure air switches of FIG. 1.

Referring to FIG. 2, there is illustrated a low pressure air switch representing each of the air switches 30 and 32, it being understood that the switches 30 and 32 are identical.

The low pressure air switch of FIG. 2 includes a housing 56 forming two opposed cavities 58 and 60 having a common wall 62 therebetween. A bore 64 extends from the cavity 58 into the wall 62. A bore 66 extends from the outer surface of the housing 56 into the wall 62 and intersects the bore 64. A counterbore 68 is provided into which one end of a tube 70 is inserted. The other end of the tube 70 terminates in a connector 72 at the inlet side of a one-way air valve 74 carried within the connector 72. The one-way air valve 74 is illustrated as a conventional duck bill valve wherein air may pass freely in a direction from its inlet to its outlet but may not pass in a direction from its outlet to its inlet.

A spring retainer 76 is positioned within the cavity 58. A cap 78 and a filter retainer 80 are secured at the open end of the cavity 58 such as, by crimping, and contain an air filter 82. The cap 78 and filter retainer 80 have holes therein so as to provide a pneumatic path therethrough. A spring 84 is carried within the spring retainer 76 and is compressed between the base thereof and the cap 78 and filter retainer 80 assembly. A resilient air seal 86 having a circular sealing head is carried by the spring retainer 76 such that the spring 84 under compression biases the head of the air seal 86 around the bore 64 so as to provide a pneumatic seal between the bore 64 and the cavity 58. The air seal 86, spring 84 and wall 62 cooperate to form a normally closed valve unit.

A bellows assembly 88 including a bellows 90 secured to an elongated base 92 is positioned such that the bellows 90 extends into the cavity 60. The housing 56 is crimped into a groove 94 on the elongated base 92 so as to secure the bellows assembly 88 to the housing 56.

A bore 96 extends to the interior of the bellows 90 and a threaded counterbore 98 is provided having a valve seat 100 around the bore 96. A bore 102 is provided which intersects the counterbore 98 and, through an opening 104, provides for pneumatic communication between the bore 98 and the exterior of the housing 56. An equalizer valve 106 is threaded into the counterbore 98. The equalizer valve 106 has a resilient seal member 108 on the end thereof which, when the equalizer valve is threaded into the counterbore 98, bears against the valve seat 100 to provide a pneumatic seal between the interior of the bellows 10 and the exterior of the housing 56. The equalizer valve 106 includes an enlarged portion 110 which, when the equalizer valve 106 is threaded into the counterbore 98, is positioned in a counterbore 112. The enlarged portion 110 has a groove 114 in which an O-ring 116 is inserted to provide a seal between the equalizer valve 106 and the elongated base 92. A gasket 118 is provided which seats against an enlarged portion of the elongated base 92. Additionally, a gasket 120 is provided which seats against an enlarged portion of the connector 72.

The wall 62 has a number of openings 122 extending therethrough between the cavities 58 and 60. A corresponding number of push rods 124 are positioned through the openings 122 and engage the underside of the spring retainer 76 and the moveable face of the bellows 90. The bellows 90, which has a spring rate tending to extend itself, maintains the push rods 124 into engagement with the spring retainer 76. The diameter of the openings 122 is greater than the diameter of the push rods 124 so as to allow pneumatic communication between the cavities 58 and 60.

The elongated base 92 and the connector 72 are externally threaded. These threaded portions are positioned through corresponding openings in one of the rims 22 or 24 of FIG. 1 and are secured thereto by nuts (not shown) such that the gaskets 118 and 120 sealingly engage the rim on the interior thereof. As assembled, the housing 56, including the bellows 90 of the bellows assembly 88, is positioned within the respective pneumatic tire 26 or 28 when the tire is mounted on the rim.

A low pressure air switch such as described with respect to FIG. 2 is mounted on each of the rims 22 and 24 of FIG. 1. Following the mounting thereof, the air hoses 38 and 42 are coupled to the connector 72 of the respective air switch 30 and 32 at the air outlet side of the one-way valve 74. The remaining ends of these air hoses are coupled to respective air inlet ports of the air actuator 40.

The air pressure switch 30 of FIG. 1 operates as follows, it being understood that the air pressure switch 32 operates in identical manner. The pneumatic tire 26 is inflated to the desired operating pressure. Following inflation, the equalizer valve 106 of the switch 30 is manually threaded outward so as to unseat the resilient seal member 108 from the valve seat 100 and allow pneumatic communication between the interior of the bellows 90 and the interior of the pneumatic tire 26 through the bore 96, the counterbore 98, the bore 102 and the opening 104. Tire air then enters the bellows 90 at a pressure equal to the inflated pressure of the pneumatic tire 26. The equalizer valve 106 is then manually threaded inward so as to seat the resilient seal 108 against the valve seat 100 and seal the interior of the bellows 90. In this manner, the inflated pressure of the tire 26 becomes a reference pressure within the bellows 90. At this time and under normal operating conditions, the interior pressure of the bellows 90 and the pressure of the air inside the tire 26 remain the same. Also, the pressure within the cavities 58 and 60 is always equal to the pressure within the tire 26 as a result of the pneumatic communication therebetween. Since the bellows 90 is positioned within the interior of the pneumatic tire 26, the air therein is at the same temperature as the air within the tire 26. Consequently, the air pressure within the bellows 90 will be affected by temperature in the same manner as the air pressure within the tire 26. Consequently the force exerted by the bellows 90 on the push rods 124 and therefore against the spring retainer 76 is unaffected by temperature variations. This force is determined solely by the spring rate of the bellows 90 when the reference pressure therein is equal to the tire pressure.

During normal operating conditions, the air seal 86 is biased against the wall 62 to prevent tire air from passing to the actuator 40 by the spring 84 and the differential air pressure across the air seal 86. Upon a decrease in the pressure in the pneumatic tire 26, the moveable face of the bellows 90 exerts a force on the push rods 124 and consequently the air seal 86 which is a function of the difference between the pressure of the interior of the bellows 90 and the tire pressure. At a differential pressure determined by the area of the seal member 86, the compression force of the spring 76 and the spring rate of the bellows 90, the bellows 90 is moved to lift the spring retainer 76 and the attached air seal 86 from the wall 62 to allow tire air under pressure into the tube 70 from the cavity 58. This air under pressure is passed to the actuator 40 through the one-way valve 74 and the air hose. As previously indicated, the actuator 40 is responsive to this air under pressure from the tire 26 to generate a magnetic field which is sensed to provide an indication of the decreased tire pressure. The one-way valve 74 prevents the air supplied to the actuator 40 from returning to the tire 26 if the tire pressure decreases below the pressure at which the seal member 86 was unseated.

Re-inflation of the tire 26 to the initial pressure functions to reset the low pressure air switch 30 by reseating the valve 86 against the wall 62 to seal the air passage to the actuator 40 from the cavity 58. Further, any new desired reference pressure may be set by threading the equalizer valve 106 outward so as to equalize the pressure between the interior of the bellows 90 and the pneumatic tire 26 as previously described and then threading the equalizer valve 106 inward to again seal the interior of the bellows 90.

Figure 3:
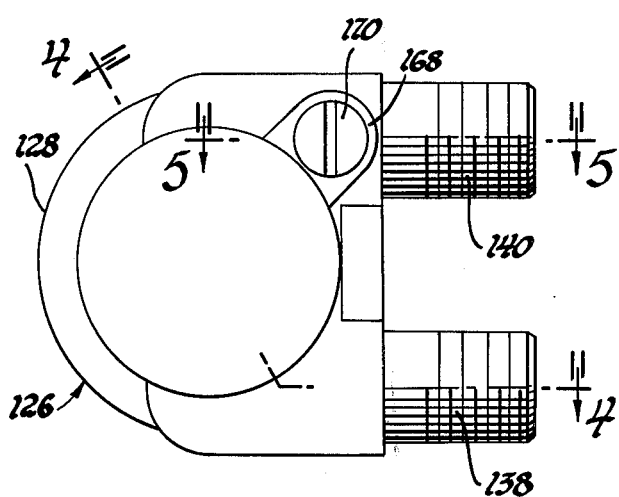
FIG. 3 is an end view of the actuator of FIG. 1.
Figure 4:
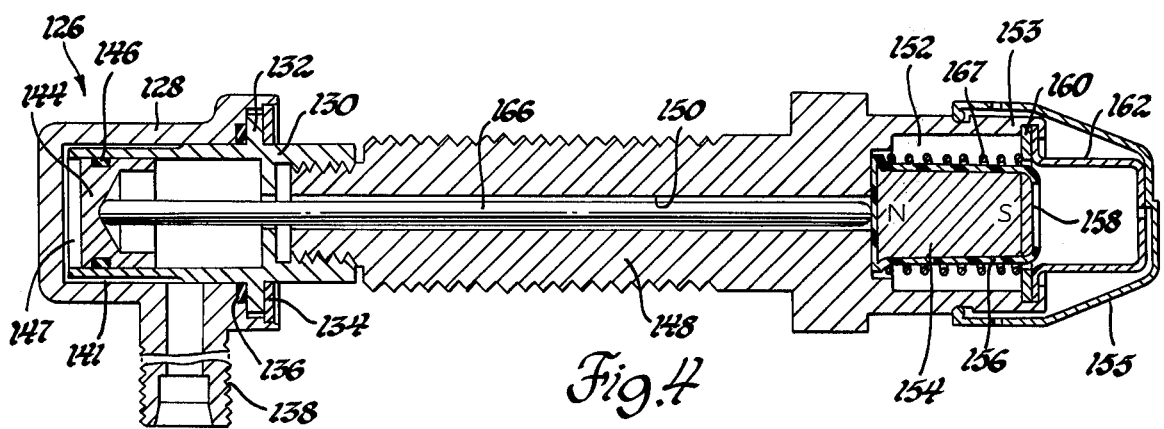
FIG. 4 is a view of the actuator taken along lines 4—4 of FIG. 3.
Figure 5:
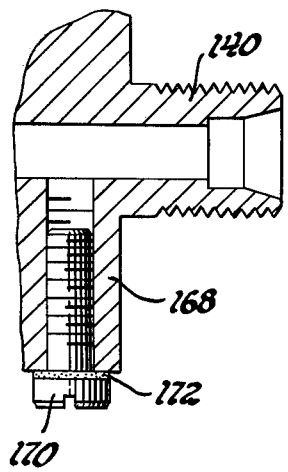
FIG. 5 is a view of the actuator taken along lines 5—5 of FIG. 3.

Referring to FIGS. 3, 4, and 5, there is illustrated the actuator 40 of FIG. 1. The actuator 40 includes a piston housing 126 comprised of a shell 128 within which a sleeve 130 is positioned. The sleeve 130 includes a flange 132 which in turn has an annular ring 134 positioned adjacent thereto. The shell 122 extends around the flange 132 and ring 134 and is crimped so as to clamp the ring 132 between the crimped portion and the flange 132. An O-ring 136 is clamped between the flange 132 and the shell 128 to provide a pneumatic seal. The shell 128 includes a pair of inlet ports 138 and 140 to which the air hoses 38 and 42 are coupled, respectively. The sleeve 130 includes a portion having a reduced outer diameter so as to form a channel 141 which provides pneumatic communication between the inlet ports 138 and 140 and the interior of the sleeve 130. A piston 144 is positioned within the sleeve 130 and includes a groove containing an O-ring 146 which is compressed between the piston 144 and the internal wall of the sleeve 130 to provide for a pneumatic seal. The piston 144, sleeve 130 and the shell 128 cooperate to form a piston drive chamber 147. The sleeve 130 is threaded onto a base bolt 148 having a bore 150 extending lengthwise therethrough. The base bolt 148, which is comprised of a magnetic material, has a cavity 152 formed by a circular wall 153 at the end opposite from the piston housing 126. A dust shield 155 is provided around the end of the cavity 152.

A magnet 154 is contained within a magnet holder 156 comprised of nonmagnetic material. The magnet 154 and magnet holder 156 is positioned within the cavity 152 with one pole face of the magnet 154 being adjacent the bottom of the cavity 152. As the base bolt 148 is comprised of a magnetic material, an attractive force exists between the base bolt 148 and the magnet 154 which operates to latch the magnet 154 to the bottom surface of the cavity 152. The strength of the latching force is controlled by the thickness of the nonmagnetic magnet holder 156. For example, by increasing the thickness of the magnet holder 156 between the magnet 154 and the base bolt 148, the latch force may be reduced and conversely, by decreasing the thickness, the magnetic latch force may be increased.

A flux disk 158 comprised of magnetic material is secured to the second pole face of the magnet 154. A flux ring 160 comprised of magnetic material and a cap 162 are secured at the open end of the cavity 152 such as by crimping. The flux ring 160 surrounds and is adjacent the flux disk 158 when the magnet 154 is positioned in the cavity 152 as shown in FIG. 4. The flux disk 158, the flux ring 160, the walls 153 of the cavity 152, and the base bolt body 148 form a closed flux path for the magnet 154 when in the position illustrated in FIG. 4. Consequently, there is virtually no external magnetic field supplied by the magnet 154.

A push rod 166 extends through the bore 150 of the base bolt 148. One end of the push rod 166 engages the piston 144 and the other end thereof engages the end of the magnet 154 abutting the bottom of the cavity 152. The length of the push rod 166 is such that when the magnet 154 is magnetically latched to the base bolt 148, the piston 144 is substantially positioned outward as illustrated in FIG. 4. A spring 167 surrounds the magnet holder 156 and compressibly engages the flux ring 160 and a flared out portion of the magnet holder 56 so as to bias the magnet 154, the push rod 166 and the piston 144 to the position illustrated in FIG. 4.

As seen in FIGS. 3 and 5, an internally threaded air vent 168 is provided on the shell 128 which intersects the air vent 140. A swrew 170 is normally threaded into the air vent 168 with an O-ring 172 compressed between the screw 170 and the air vent 168 so as to provide a pneumatic seal.

The actuator 40 is mounted on the face of the brake drum 18 by means of external threads on the base bolt 148. The operation of the actuator 40 is as follows. When the pneumatic tires 26 and 28 of FIG. 1 are at the proper pressures as determined by the reference set in the low pressure air switches 30 and 32, the piston 144 and magnet 154 are in their normal positions illustrated in FIG. 4 wherein the magnet 154 is magnetically shorted, the magnetic flux being coupled between the two pole faces through the flux disk 158, the flux ring 160, the wall 153 and the body of the base bolt 148. In this position, no external magnetic field is generated. Further, the magnet 154 provides a magnetic latch by its attraction with the base 148 which, with the force of the spring 167 prevents the magnet 154 from being moved outwardly as a result of lateral movements of the vehicle. As previously indicated, the magnitude of this latch can be determined by the thickness of the magnet retainer 156.

When the pressure within one of the pneumatic tires 26 or 28 decreases to a level determined by the low pressure air switches 30 and 32, respectively, air at the pressure of the respective tire is coupled to one of the inlet ports 138 or 140 and into the piston drive chamber 147. The piston 144 is moved by the pressure exerted thereon by the tire air to move the push rod 166 and the magnet 154 outwardly. When the magnetic latch is broken, the resulting decrease in the force exerted against the piston 144 by the magnet 154 and the spring 167 is suddenly reduced and the magnet 154 is positioned rapidly to an outward position in the cap 162. In its actuated position, the magnet 154 is in an essential open circuit magnetic condition. This transition from a closed magnetic circuit to an open magnetic circuit when the magnet 154 is positioned to its actuated position causes a rapid shift of the flux pattern which couples through the air to the sensor 44 when the actuator 40 is rotated to a position in alignment with the sensor 44. The strong magnetic field when the magnet 154 is operating in an open circuit condition is sensed by the sensor 44 which is positioned adjacent the path traced by the magnet as it is rotated by the wheel 14.

The actuator 40 may be reset to its original unactuated condition by threading the screw 170 outward to permit the air under pressure in the piston drive chamber 147 to bleed to atmosphere through the air port 168. When the pressure has decreased toward atmosphered pressure, the spring 167 operates to position the magnet 154 and the piston 144 to the initial position illustrated in FIG. 4.

Figure 6:
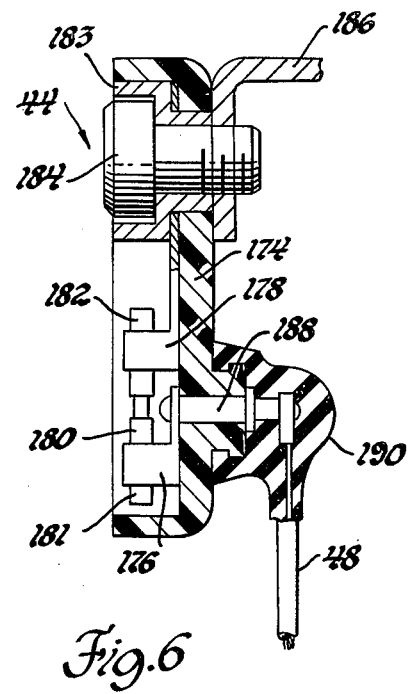
FIG. 6 is a sectional view of the sensor of FIG. 1.

Referring to FIG. 6, the sensor 44 is comprised of a shell 174 of a nonconducting material upon which a pair of clips 176 and 178 are mounted spaced from one another. A reed switch 180 having terminals 181 and 182 is secured by the clips 176 and 178. A metallic bushing 183 extends through an opening of the shell 174 and engages a flared out portion of the clip 178. A bolt 184 couples the shell 174 to the mounting bracket 46 also comprised of a conductive material. The bracket 186 is secured to the axle housing and plate member assembly and as such is grounded so as to ground the clip 176 and the terminal 182 of the reed switch 180. A conductor 188 extends through the shell 174 and engages the clip 176. The end of the cable 48 engages the conductor 188 at a connector 190 which is secured to the shell 174. The sensor 44 is mounted on the axle housing and plate member assembly such that the reed switch 180 is positioned adjacent the path traced by the end of the actuator 40 of FIG. 4. When the magnet 154 of the actuator is in its retracted position, there is no magnetic field generated and the reed switch 180 is in an open circuit position. Upon decrease of pressure in one of the tires 26 or 28 to the specified pressure wherein the respective low pressure air switch 30 or 32 supplies air under pressure to the actuator 40, the magnet 154 is positioned outward as previously described. The resulting external magnetic field which is generated operates to close the reed switch 180 and ground the cable 48 when the actuator 40 is rotated to a position adjacent the sensor 44. This ground signal is coupled to the signal processor via the cable 48.

Figure 7:
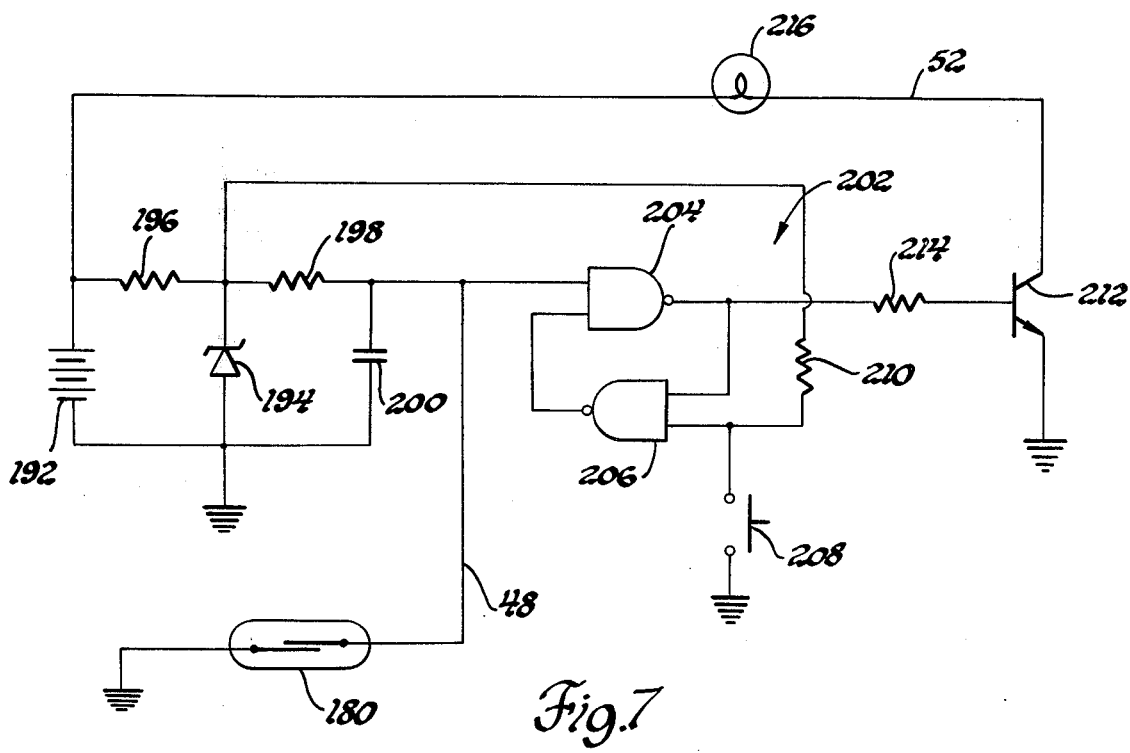
FIG. 7 is a schematic diagram of a circuit associated with one of the tires of a vehicle for providing a low tire pressure indication.

The signal processor 50 is comprised of circuits responsive to the ground signal supplied by the sensors such as the sensor 44 of FIG. 6 for energizing the appropriate warning at the instrument panel display 54. One of such circuits is illustrated in FIG. 7. As seen therein, a DC battery 192, which may be, for example, the vehicle battery, has its positive terminal coupled to the cathode of a Zener diode 194 through a current limiting resistor 196. The anode of the Zener diode 194 is coupled to the negative terminal of the DC battery 192 which is grounded to the vehicle chassis. The zener diode 194, which provides a regulated voltage, further has its cathode coupled to ground through a resistor 198 and a filtering capacitor 200.

A set-reset latching circuit 202 is comprised of a two input NAND gate 204 and a two input NAND gate 206. The output of the NAND gate 204 is coupled to one input of the NAND gate 206 whose output is coupled to one input of the NAND gate 204. The second input of the NAND gate 204 comprises the set input of the latching circuit 202 which is coupled to the junction between the resistor 198 and the capacitor 200. The second input of the NAND gate 206 comprises the reset of the latching circuit 202 which is coupled to ground through a normally open push button switch 208 and to the cathode of the Zener diode 194 through a resistor 210. The output of the NAND gate 204 comprises the output of the latching circuit 202 which is coupled to the base electrode of an NPN transistor 212 through a resistor 214. The emitter electrode of the transistor 212 is coupled to ground and its collector electrode is coupled to a warning lamp 216 in the instrument panel display 54 via the cable 52. The other side of the warning lamp 216 is coupled to the positive terminal of the DC battery 192. The output of the reed switch 180 of FIG. 6 is coupled to the set input of the latching circuit 202 via the cable 48.

Assuming the latching circuit 202 reset, its output is a ground signal coupled to the base electrode of the transistor 212 which is biased nonconductive. Further assuming that the vehicle tire pressure is at the desired pressure, the inputs to the set and reset inputs of the latching circuit 202 are positive voltages from the cathode of the Zener diode 194. This condition represents the normal operating condition of the tire pressure warning system when the vehicle tires such as the tires 26 and 28 are at the proper inflated pressures. If one of the pneumatic tires such as the tires 26 and 28 were to lose pressure to the specified warning pressure determined by the low pressure air switch 30 or 32, the actuator 126 generates the magnetic field in the manner previously described which closes the reed switch 180 once each revolution of the wheel 14. A ground signal is coupled through the cable 48 to the set input of the latching circuit 202 when the reed switch is closed to cause its output to shift to a positive voltage which is coupled to the respective input of the NAND gate 206 and to the base electrode of the transistor 212. As both inputs of the NAND gate 206 are at positive voltages, the output thereof shifts to ground potential to latch the output of the NAND gate and consequently the latching circuit 202 to a positive voltage. This voltage biases the transistor 212 conductive to provide a ground through the cable 52 to the lamp 216 in the instrument panel display 54. The lamp 216 is energized to provide an indication of the low tire pressure.

When the actuator 40 is rotated by the wheel away from the reed switch 180, the reed switch 180 opens to remove the ground signal from the input of the NAND gate 204. This has no affect on the output thereof in view of the ground input to the NAND gate 204 from the NAND gate 206. Consequently, the latching circuit 202 is latched so as to effect a continuous warning by the lamp 216. Upon reinflation of the pneumatic tire 26 or 28, and the resulting resetting of the respective low pressure air switch 30 or 32 and the actuator 40, the warning lamp 216 may be extinguished by manual actuation of the normally open push button switch 208 which supplies a ground signal to the reset input of the latching circuit 202. The ground input to the reset input causes the output of the NAND gate 206 to shift to a positive voltage level. As the set input of the NAND gate 204 is a positive voltage from the Zener diode 194, its output shifts to ground potential which is maintained after the push button switch 208 is opened. This ground potential biases the transistor 212 into nonconduction to extinguish the lamp 216.

Although a circuit for providing an indication of the deflation of the pneumatic tires 26 or 28 on a single wheel 14, it is understood that a plurality of such circuits are provided to provide an indication of the deflation of the pneumatic tires on each set of wheels on the vehicle.

The foregoing description of a preferred embodiment of the invention for the purpose of explaining the principles thereof is not to be considered as limiting or restricting the invention, since many modifications may be made by the exercise of skill in the art without departing from the scope of the invention.

We claim:

1. A pneumatic tire low pressure warning system comprising: a wheel; a pneumatic tire carried by the wheel, the tire being normally inflated to a specified pressure; a low pressure air switch, the low pressure air switch including a housing secured to the wheel and having a cavity therein exposed to the internal pneumatic tire pressure temperature, a normally closed valve unit carried on the housing and having an inlet side exposed to the internal tire pressure and having an outlet side, a bellows within the cavity, means coupling the bellows and the normally closed valve unit, the normally closed valve unit being opened when the bellows is extended, and a manually actuated equalizer valve extending through the wheel and being operable to selectively provide pneumatic communication between the bellows interior and the pneumatic tire interior and seal the bellows interior from the pneumatic tire interior, the equalizer valve being operated to provide pneumatic communication between the interior of the tire and the bellows when the tire is at the specified pressure and thereafter closed so as to establish a temperature variable reference pressure within the bellows, the bellows being extended when the air pressure in the pneumatic tire decreases to a certain level below the reference pressure within the bellows to open the normally closed valve unit; an actuator carried by the wheel external of the pneumatic tire; means pneumatically coupling the outlet side of the normally closed valve unit to the actuator, the actuator being operated by tire air supplied thereto when the normally closed valve unit is opened by the bellows; and means for sensing the operation of the actuator and providing a warning, whereby the warning represents the decrease in the pneumatic tire pressure below the manually set, temperature variable reference pressure in the bellows.

2. A low pressure warning system for a vehicle having a wheel mounted pneumatic tire normally inflated to a specified pressure, said system comprising: an actuator carried on the wheel external to the tire, the actuator including a base member of magnetic material, a magnet having first and second magnetic pole faces, the first pole face being normally positioned adjacent the base member to form a magnetic latching force therebetween, a first magnetic flux carrying member secured to and approximately covering the second magnetic pole face, a second magnetic flux carrying member secured to the base member and in close proximity to the first magnetic flux carrying member when the first pole face is in its normal position, the first and second flux carrying members and the base member cooperating to form a closed magnetic flux path between the first and second pole faces when the first pole face is in its normal position, a pressure responsive member including a sealed chamber and a moveable element having one side exposed to the pressure within the sealed chamber, and means coupling the moveable element and the magnet; a low pressure air switch carried by the wheel and responsive to internal tire pressure; an air hose coupling the air switch to the sealed chamber, the air switch coupling tire air to the sealed chamber when the tire air pressure decreases to a certain pressure less than the specified pressure, the moveable element being moved by tire air pressure coupled thereto against the magnetic latching force between the magnet and the base member to move the magnet from its normal position to an extended position to generate an external magnetic field; and means carried on the vehicle and stationary relative thereto for sensing the external magnetic field and generating a signal representing the decreased tire pressure.

3. A low pressure warning system for a vehicle having a wheel mounted pneumatic tire normally inflated to a specified pressure, said system comprising: a low pressure air switch, the low pressure air switch including a housing secured to the wheel and having a cavity therein exposed to the internal pneumatic tire pressure and temperature, a normally closed valve unit carried on the housing and having an inlet side exposed to the internal tire pressure and having an outlet side, a bellows within the cavity, means coupling the bellows and the normally closed valve unit, the normally closed valve unit being opened when the bellows is extended, and a manually actuated equalizer valve extending through the wheel and being operable to selectively provide pneumatic communication between the bellows interior and the pneumatic tire interior and seal the bellows interior from the pneumatic tire interior, the equalizer valve being operated to provide pneumatic communication between the interior of the tire and the bellows when the tire is at the specified pressure and thereafter closed so as to establish a temperature variable reference pressure within the bellows, the bellows being extended when the air pressure in the pneumatic tire decreases to a certain level below the reference pressure within the bellows to open the normally closed valve unit; an actuator carried on the wheel external to the tire, the actuator including a base member of magnetic material having an open ended chamber formed on the end thereof, a magnet having first and second magnetic pole faces, the first pole face being normally positioned adjacent the bottom of the chamber to form a magnetic latching force therebetween, the magnet approximately extending the length of the chamber, spring means for biasing the magnet into the chamber, a first magnetic flux carrying member secured to and approximately covering the second magnetic pole face, a second magnetic flux carrying member secured to the walls of the chamber adjacent the first magnetic flux carrying member when the first pole face is in its normal position to complete a magnetic short circuit flux path between the first and second pole faces, a pressure responsive member including a sealed chamber and a moveable element having one side exposed to the pressure within the sealed chamber, and means coupling the moveable element and the magnet; means for pneumatically coupling the outlet side of the normally closed valve unit to the sealed chamber, the normally closed valve unit being opened by the bellows to couple tire air pressure to the sealed chamber when the tire air pressure decreases to a determined pressure less than the specified pressure, the moveable element being moved by tire air pressure coupled thereto against the magnetic latching force between the magnet and the base member and the bias of the spring means to move the magnet from its normal position to an extended position to generate an external magnetic field; a reed switch carried on the vehicle adjacent the path traced by the magnet in its extended position, the reed switch being closed by the external magnetic field; latching means responsive to the closure of the reed switch for generating a continuous signal; and indicating means responsive to the signal for providing a warning of the low tire pressure.

4. A low pressure warning system for a vehicle having a wheel mounted pneumatic tire normally inflated to a specified pressure, said system comprising: an actuator carried on the wheel external to the tire, the actuator including a magnet means having first and second magnetic pole faces and being moveable between a normal and an extended position, a hollow base member of magnetic material receiving the magnet means for forming a closed magnetic flux path between the first and second pole faces when the magnet means is in its normal position, one of the pole faces being adjacent the base member to form a magnetic latching force therebetween when the magnet means is in its normal position, a pressure responsive member including a chamber and a moveable element having one side exposed to the pressure within the chamber, and means coupling the moveable element and the magnet; a low pressure air switch carried by the wheel and responsive to internal tire pressure; an air hose coupling the air switch to the chamber, the air switch coupling tire air to the chamber when the tire air pressure decreases to a certain pressure less than the specified pressure, the moveable element being moved by tire air pressure coupled thereto against the magnetic latching force between the magnet and the base member to move the magnet from its normal position to an extended position to generate an external magnetic field; and means carried on the vehicle and stationary relative thereto for sensing the external magnetic field and generating a signal representing the decreased tire pressure.

* * * * *